(12) United States Patent
Prenter et al.

(10) Patent No.: US 11,371,700 B2
(45) Date of Patent: Jun. 28, 2022

(54) DEFLECTOR FOR CONDUIT INLET WITHIN A COMBUSTOR SECTION PLENUM

(71) Applicant: Raytheon Technologies Corporation, Farmington, CT (US)

(72) Inventors: Robin Prenter, St. Augustine, FL (US); Ryan Lundgreen, Provo, UT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/929,673

(22) Filed: Jul. 15, 2020

(65) Prior Publication Data
US 2022/0018540 A1    Jan. 20, 2022

(51) Int. Cl.
*F23R 3/00* (2006.01)
*F23R 3/04* (2006.01)

(52) U.S. Cl.
CPC .............. *F23R 3/002* (2013.01); *F23R 3/005* (2013.01); *F23R 3/04* (2013.01); *F23R 2900/03044* (2013.01)

(58) Field of Classification Search
CPC .. F23R 3/002; F23R 3/005; F23R 3/04; F23R 2900/03044; F01D 5/028; F01D 5/087; F01D 25/14; F01D 9/02; F01D 5/08; F01D 25/12; F01D 25/32; F01D 5/081; F02C 6/08; F02C 9/18; F02C 9/52; F02C 7/052; F04D 29/44; F04D 29/54
See application file for complete search history.

(56) References Cited

U.S. PATENT DOCUMENTS

| 4,291,531 | A | * | 9/1981 | Campbell | ................ F02C 7/18 60/39.511 |
| 4,466,239 | A | * | 8/1984 | Napoli | ................ F02C 7/18 60/782 |
| H903 | H | * | 4/1991 | Weinstein | ................ F01D 5/08 60/757 |
| 5,402,636 | A | | 4/1995 | Mize | |
| 8,069,669 | B2 | * | 12/2011 | Pieussergues | ............ F23R 3/50 60/752 |
| 9,810,079 | B2 | | 11/2017 | Manning | |
| 9,945,248 | B2 | | 4/2018 | Mccaffrey | |
| 10,400,795 | B2 | | 9/2019 | Mook | |
| 10,450,951 | B2 | | 10/2019 | Rahaim | |
| 10,450,960 | B2 | | 10/2019 | Zelesky | |
| 10,494,938 | B2 | | 12/2019 | Harris | |

(Continued)

OTHER PUBLICATIONS

EP search report for EP21185949.1 dated Dec. 6, 2021.

*Primary Examiner* — Arun Goyal
*Assistant Examiner* — Henry Ng
(74) *Attorney, Agent, or Firm* — Getz Balich LLC (57) ABSTRACT

An assembly is provided for a gas turbine engine. This assembly includes a combustor wall, a case and an inlet. The combustor wall is configured with a quench aperture. The case is displaced from the combustor wall such that a plenum is formed by and extends between the combustor wall and the case. The case includes a case wall, a deflector and a conduit. The deflector projects out from the case wall into the plenum towards the combustor wall. The deflector is arranged upstream of the quench aperture. The inlet to the conduit is arranged next to and downstream of the deflector.

18 Claims, 7 Drawing Sheets

(56) References Cited

U.S. PATENT DOCUMENTS

| | | | |
|---|---|---|---|
| 2002/0172591 A1* | 11/2002 | Glynn | F01D 5/18 |
| | | | 415/115 |
| 2008/0041064 A1 | 2/2008 | Moore | |
| 2008/0155988 A1* | 7/2008 | Commaret | F23R 3/04 |
| | | | 60/755 |
| 2010/0012750 A1* | 1/2010 | Duncan | F23R 3/28 |
| | | | 239/265.19 |
| 2010/0287941 A1 | 11/2010 | Kim et al. | |
| 2012/0321453 A1 | 12/2012 | Alvanos | |
| 2013/0025293 A1 | 1/2013 | Kim | |
| 2014/0290254 A1 | 10/2014 | Manning | |
| 2016/0017755 A1 | 1/2016 | Low | |
| 2017/0138262 A1 | 5/2017 | Atsuchi | |
| 2017/0198636 A1 | 7/2017 | Clum | |
| 2017/0292393 A1 | 10/2017 | Anastas | |
| 2019/0078515 A1* | 3/2019 | Atsuchi | F02C 9/18 |

* cited by examiner

DEFLECTOR FOR CONDUIT INLET WITHIN A COMBUSTOR SECTION PLENUM

BACKGROUND OF THE DISCLOSURE

1. Technical Field

This disclosure relates generally to a gas turbine engine and, more particularly, to bleeding fluid from a plenum adjacent a combustor wall.

2. Background Information

A gas turbine engine may operate in conditions where airborne debris is ingested by the turbine engine. Such debris may travel through the turbine engine and into a plenum surrounding a combustor. As a result, cooling flows bled from the plenum may include the debris entrained therein. This debris may then be deposited and accumulate on surfaces of components being cooled with the cooling flows. Such debris deposits/accumulations may form insulating layers over the surfaces to be cooled by the cooling flows thereby reducing the cooling effectiveness of the cooling flows. This in turn may lead to premature failure and, thus, shorter service lives of the cooled components. There is a need in the art therefore for methods and/or assemblies which can reduce or prevent debris deposits/accumulations on cooled surfaces.

SUMMARY OF THE DISCLOSURE

According to an aspect of the present disclosure, an assembly is provided for a gas turbine engine. This assembly includes a combustor wall, a case and an inlet. The combustor wall is configured with a quench aperture. The case is displaced from the combustor wall such that a plenum is formed by and extends between the combustor wall and the case. The case includes a case wall, a deflector and a conduit. The deflector projects out from the case wall into the plenum towards the combustor wall. The deflector is arranged upstream of the quench aperture. The inlet to the conduit is arranged next to and downstream of the deflector.

According to another aspect of the present disclosure, another assembly is provided for a gas turbine engine. This assembly includes a combustor wall, a case and an inlet. The combustor wall extends axially along and circumferentially about an axial centerline. The case is radially displaced form the combustor wall. A plenum extends radially from the case to the combustor wall. The case includes a case wall, a deflector and a conduit. The deflector projects out from the case wall, into the plenum and towards the combustor wall, to an aft distal end of the deflector. The deflector is axially overlapped by an axially forward half of the combustor wall. The inlet to the conduit is arranged at the aft distal end of the deflector.

According to still another aspect of the present disclosure, another assembly is provided for a gas turbine engine. This assembly includes a combustor wall, a case and an inlet. The combustor wall extends axially along and circumferentially about an axial centerline of the gas turbine engine. The case is radially displaced form the combustor wall. A plenum extends radially between the case and the combustor wall. The case includes a case wall, a deflector, a conduit and a gate. The deflector projects out from the case wall into the plenum towards the combustor wall. The inlet of the conduit is arranged axially between the deflector and the gate. The gate projects out from the conduit into the plenum towards the combustor wall. The gate is configured to reduce or prevent recirculating gas within the plenum from flowing into the inlet.

An axially forward end of the gate may be arranged axially upstream of a quench aperture in the combustor wall.

The case may be displaced radially inward of the combustor wall relative to an axis of the gas turbine engine.

The deflector may be arranged axially forward of the quench aperture relative to an axis of the gas turbine engine.

The deflector may be axially overlapped by an axial forwardmost half of the combustor wall.

The deflector may be configured as or otherwise include a ramped deflector.

The deflector may be cantilevered from the case wall.

The deflector may project out from the case wall in a direction that includes a radial outward component and an axially aft component relative to an axis of the gas turbine engine.

The deflector may be configured such that gas flowing within the plenum turns more than ninety degrees around a distal end of the deflector before entering the inlet.

The case may also include a gate projecting out from the conduit. The gate may be configured to reduce or prevent recirculating gas within the plenum from flowing into the inlet.

The deflector may have a deflector chord line that is angularly offset form an axis by a deflector angle. The gate may have a gate chord line that is angularly offset from the axis by a gate angle that is equal to the deflector angle.

The deflector may have a deflector chord line that is angularly offset form an axis by a deflector angle. The gate may have a gate chord line that is angularly offset from the axis by a gate angle that is different (e.g., less or greater) than the deflector angle.

The gate may be connected to the conduit at the inlet.

The gate may be cantilevered from the conduit.

The inlet may be arranged upstream of the quench aperture.

The assembly may also include a tangential onboard injector nozzle fluidly coupled with the plenum through the conduit.

The assembly may also include a turbine component. The conduit may fluidly couple a passage in the turbine component with the plenum.

The assembly may also include an annular combustor which includes an inner combustor wall, an outer combustor wall and a bulkhead. The inner combustor wall may be configured as or otherwise include the combustor wall. The bulkhead may extend radially between and may be connected to the inner combustor wall and the outer combustor wall.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
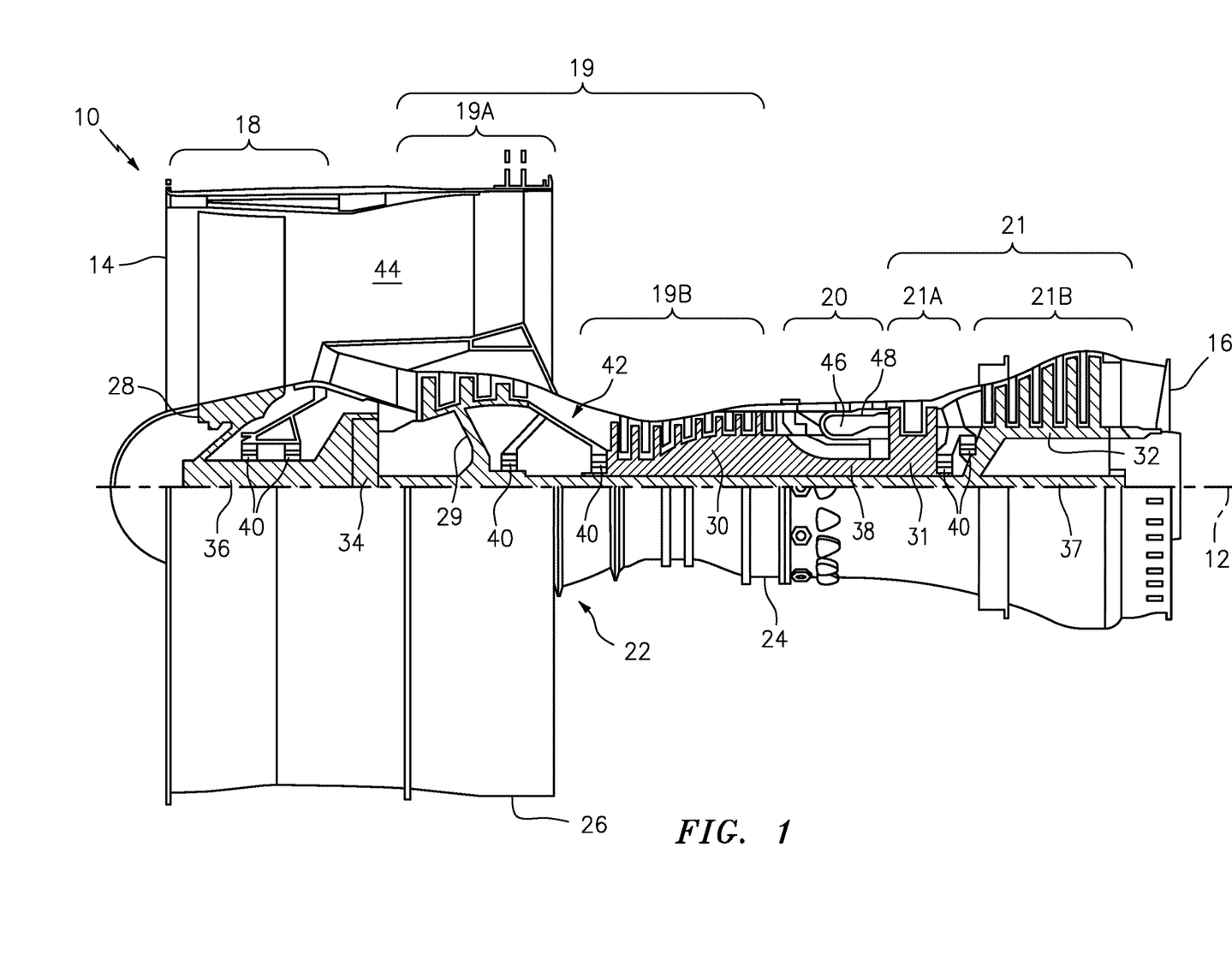
FIG. 1 is a side cutaway illustration of a gas turbine engine.

FIG. 1 is a side cutaway illustration of a gas turbine engine 10. This turbine engine 10 extends along an axial centerline 12 (e.g., a rotational axis) between a forward, upstream airflow inlet 14 and an aft, downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21B are arranged sequentially along the axial centerline 12 within an engine housing 22. This engine housing 22 includes an inner case 24 (e.g., a core case) and an outer case 26 (e.g., a fan case). The inner case 24 may house one or more of the engine sections 19A-21B; e.g., an engine core. The outer case 26 may house at least the fan section 18.

Each of the engine sections 18, 19A, 19B, 21A and 21B includes a respective rotor 28-32. Each of these rotors 28-32 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 28 is connected to a gear train 34, for example, through a coupling such as a fan shaft 36. The gear train 34 and the LPC rotor 29 are connected to and driven by the LPT rotor 32 through a low speed shaft 37. The HPC rotor 30 is connected to and driven by the HPT rotor 31 through a high speed shaft 38. The shafts 36-38 are rotatably supported by a plurality of bearings 40; e.g., rolling element and/or thrust bearings. Each of these bearings 40 is connected to the engine housing 22 by at least one stationary structure such as, for example, an annular support strut.

During operation, air enters the turbine engine 10 through the airflow inlet 14. This air is directed through the fan section 18 and into a core gas path 42 and a bypass gas path 44. The core gas path 42 extends sequentially through the engine sections 19A-21B. The air within the core gas path 42 may be referred to as "core air". The bypass gas path 44 extends through a bypass duct, which bypasses the engine core. The air within the bypass gas path 44 may be referred to as "bypass air".

The core air is compressed by the compressor rotors 29 and 30 and directed into a combustion chamber 46 of a combustor 48 in the combustor section 20. Fuel is injected into the combustion chamber 46 via one or more fuel injectors 50 (one visible in view of FIG. 2) and mixed with the compressed core air to provide a fuel-air mixture. This fuel air mixture is ignited via one or more igniters 52 (one visible in view of FIG. 2) and combustion products thereof flow through and sequentially cause the turbine rotors 31 and 32 to rotate. The rotation of the turbine rotors 31 and 32 respectively drive rotation of the compressor rotors 30 and 29 and, thus, compression of the air received from a core airflow inlet. The rotation of the turbine rotor 32 also drives rotation of the fan rotor 28, which propels bypass air through and out of the bypass gas path 44. The propulsion of the bypass air may account for a majority of thrust generated by the turbine engine 10, e.g., more than seventy-five percent (75%) of engine thrust. The turbine engine 10 of the present disclosure, however, is not limited to the foregoing exemplary thrust ratio.

Figure 2:
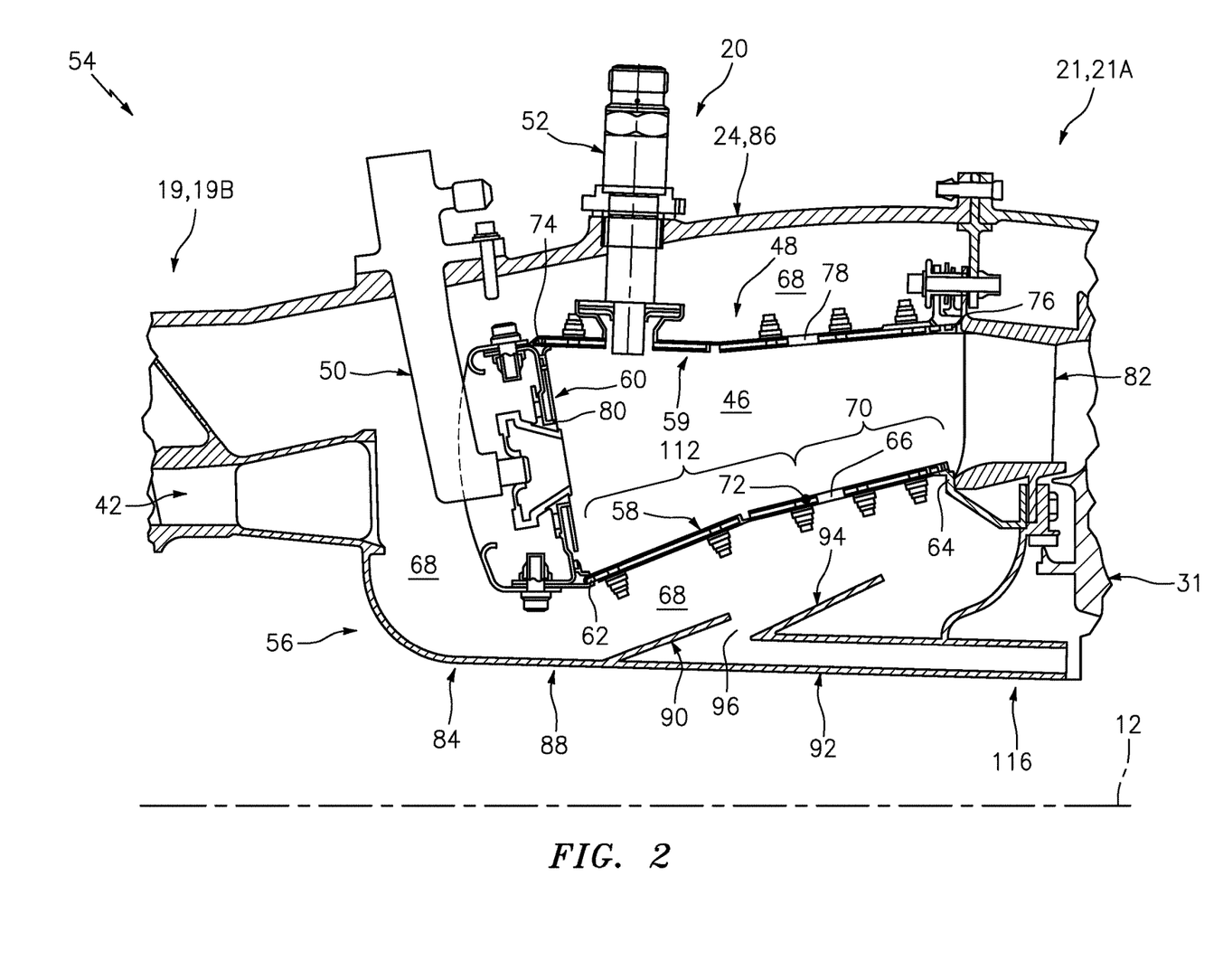
FIG. 2 is a partial side sectional illustration of a turbine engine assembly.

FIG. 2 illustrates an assembly 54 for the turbine engine 10. This turbine engine assembly 54 includes the combustor section 20 and the turbine section 21. The combustor section 20 includes the combustor 48, the one or more fuel injectors 50, the one or more igniters 52 and a diffuser 56.

Figure 3:
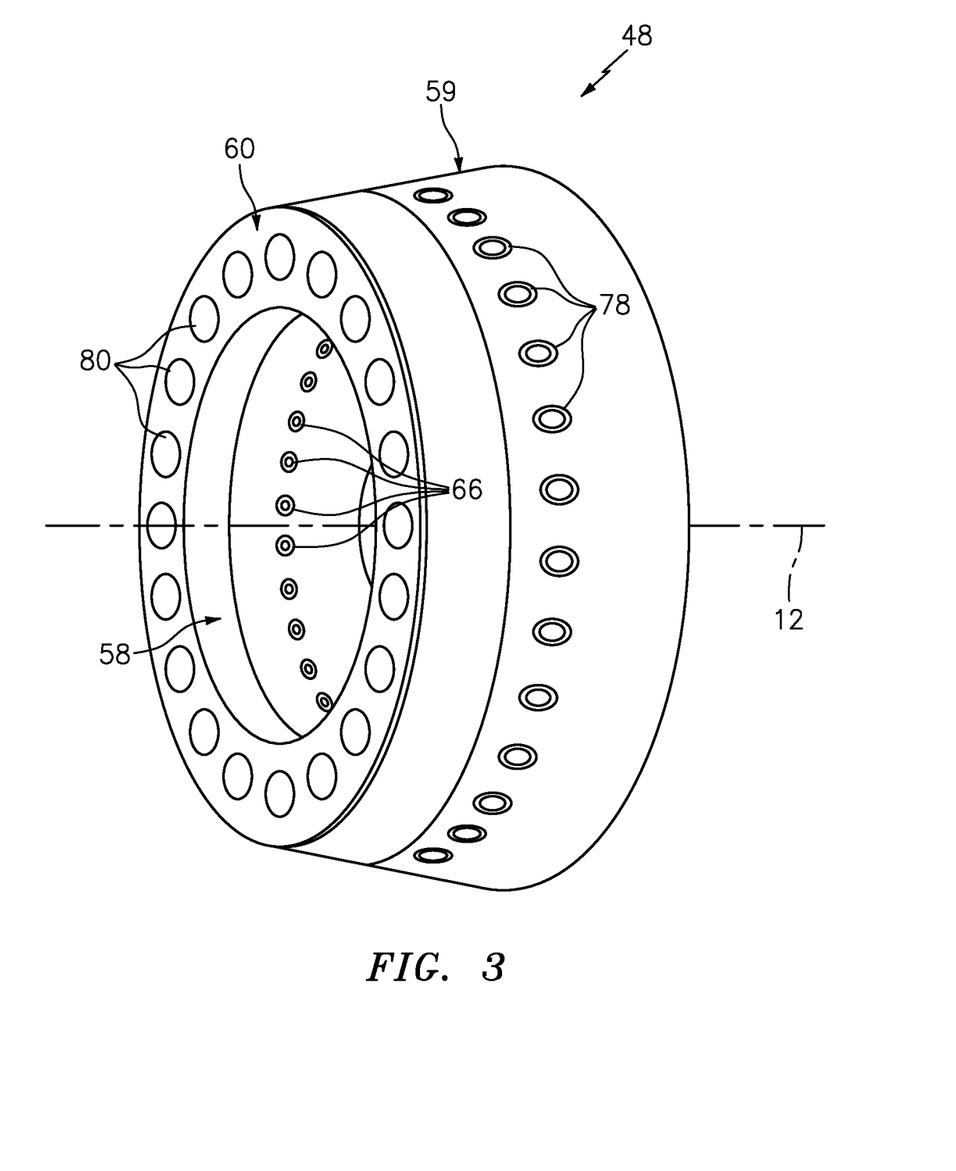
FIG. 3 is a perspective schematic illustration of a combustor.

The combustor 48 may be configured as an annular combustor; see also FIG. 3. The combustor 48 of FIG. 2, for example, includes a (e.g., tubular) inner combustor wall 58, a (e.g., tubular) outer combustor wall 59 and a (e.g., annular) bulkhead 60. One or more of each of the combustor components 58-60 may be configured as a multi (e.g., double) walled structure, or alternatively as a single walled structure. Referring to FIG. 3, each of the combustor components 58-60 extends circumferentially about (e.g., completely around) the axial centerline 12 thereby providing each component 58-60 with a respective full hoop body.

Referring to FIG. 2, the inner combustor wall 58 extends axially along the axial centerline 12 between a forward and/or upstream end 62 of the inner combustor wall 58 and an aft and/or downstream end 64 of the inner combustor wall 58. This inner combustor wall 58 includes one or more inner combustor wall quench apertures 66 (also sometimes referred to as "dilution apertures"). The term "quench aperture" may describe an aperture (e.g., a through hole) which directs gas (e.g., compressed air) into a combustor to influence combustion within a combustion chamber. The quench apertures 66, for example, are configured to influence and/or tailor stoichiometry between the gas (e.g., the core air) and the fuel within the combustion chamber 46. The inner combustor wall 58 may also include one or more cooling apertures (not shown) such as, but nor limited to, effusion apertures and/or slots. In contrast to the quench apertures 66, the cooling apertures are configured to cool the inner combustor wall 58 by providing, for example, a cooling film within the combustion chamber 46 along the inner combustor wall 58. In general, the cooling apertures may be significantly smaller in flow area than the quench apertures 66 and direct less gas into the combustion chamber 46 during turbine engine operation. A diameter of one or more or each of the quench apertures 66, for example, may be five times (5×), ten times (10×), fifteen times (15×), twenty times (20×) or more (e.g., up to 200×) a diameter of one or more or each cooling aperture. The present disclosure, however, is not limited to such an exemplary quench aperture/cooling aperture size ratio.

Each of these quench apertures 66 extends (e.g., radially) through the inner combustor wall 58 thereby fluidly coupling a combustor plenum 68 outside of the combustor 48 with the combustion chamber 46. The quench apertures 66 of FIG. 2 are arranged in an annular array, which array is located (e.g., anywhere) in an axial aftmost portion 70 of the inner combustor wall 58. This axial aftmost portion 70 may be, for example, an axial aft half of the inner combustor wall 58. More particularly, the axial aftmost portion 70 may be a portion of the inner combustor wall 58 that extends from an intermediate (e.g., mid) point 72 axially along the inner combustor wall 58 to the aft and/or downstream end 64. The present disclosure, however, is not limited to the foregoing exemplary quench aperture arrangement and/or axial location. For example, in other embodiments, the quench apertures 66 may be located (e.g., anywhere) in an axial aft third of the inner combustor wall 58, or in an axial aft third-quarters or two-thirds of the inner combustor wall 58.

The outer combustor wall 59 extends axially along the axial centerline 12 between a forward and/or upstream end 74 of the outer combustor wall 59 and an aft and/or downstream end 76 of the outer combustor wall 59. This outer combustor wall 59 includes one or more outer combustor wall quench apertures 78 (also sometimes referred to as "dilution apertures"). Each of these quench apertures 78 extends (e.g., radially) through the outer combustor wall 59 thereby fluidly coupling the combustor plenum 68 with the combustion chamber 46. The quench apertures 78 of FIG. 2 may be arranged in an annular array, which array may be located in a similar manner as described above with respect to the quench apertures 66 in the inner combustor wall 58. The present disclosure, however, is not limited to the foregoing exemplary quench aperture arrangement and/or axial location.

The bulkhead 60 extends (e.g., radially) between the inner combustor wall 58 and the outer combustor wall 59. The bulkhead 60 is connected to the inner combustor wall 58, for example, at (e.g., on, adjacent or proximate) the forward and/or upstream end 62. The bulkhead 60 is connected to the outer combustor wall 59, for example, at (e.g., on, adjacent or proximate) the forward and/or upstream end 74. The bulkhead 60 includes one or more injector assembly apertures 80 configured to respectively mate with and/or receive the one or more fuel injectors 50.

The combustion chamber 46 may be an annular combustion chamber. The combustion chamber 46 extends radially between and is formed by the inner combustor wall 58 and the outer combustor wall 59. A forward and/or upstream end of the combustion chamber 46 is formed by the bulkhead 60. An aft and/or downstream end of the combustion chamber 46 is fluidly coupled with the turbine section 21 (e.g., the HPT section 21A) through an exit nozzle vane assembly 82.

Referring still to FIG. 2, the diffuser 56 is configured to form an internal (e.g., annular) chamber in which the combustor 48 is located. The diffuser 56 of FIG. 2, for example, includes an inner diffuser case 84 and an outer diffuser case 86, which case 84 may be a segment/part of the inner case 24 of FIG. 1. Each of these diffuser cases 84 and 86 extends axially along and circumferentially about (e.g., completely around) the axial centerline 12 thereby providing each diffuser case 84, 86 with a respective full hoop (e.g., tubular) body.

The outer diffuser case 86 is displaced (e.g., radially) from the combustor 48 and its outer combustor wall 59. The outer diffuser case 86 axially overlaps at least a portion or an entirety of the combustor 48 and/or its outer combustor wall 59. An outer portion of the combustor plenum 68 thereby extends (e.g., radially) between and is formed by the outer diffuser case 86 and the outer combustor wall 59.

The inner diffuser case 84 is displaced (e.g., radially) from the combustor 48 and its inner combustor wall 58. The inner diffuser case 84 axially overlaps at least a portion or an entirety of the combustor 48 and/or its inner combustor wall 58. An inner portion of the combustor plenum 68 thereby extends (e.g., radially) between and is formed by the inner diffuser case 84 and the inner combustor wall 58.

Figure 4:
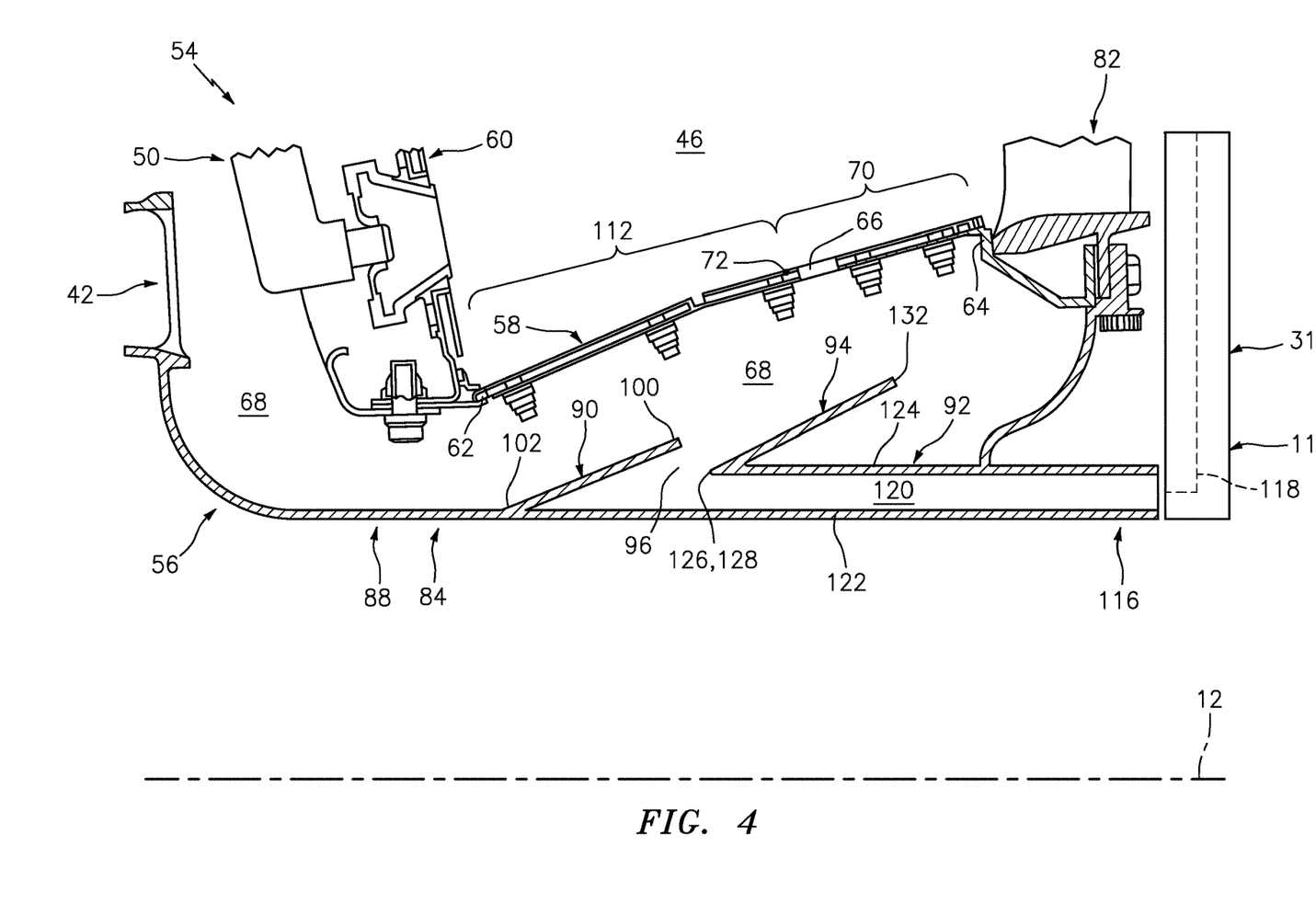
FIG. 4 is another partial side sectional illustration of the turbine engine assembly.

Referring to FIG. 4, the inner diffuser case 84 includes a case wall 88, a deflector 90 and a conduit 92. The inner diffuser case 84 of FIG. 4 also includes a gate 94; e.g., a second deflector.

The case wall 88 is configured as a tubular body. The case wall 88, for example, extends axially along the axial centerline 12 between, for example, opposing axial ends of the inner diffuser case 84. The case wall 88 extends circumferentially about (e.g., completely around) the axial centerline 12.

The deflector 90 is configured to deflect gas (e.g., air/core gas) flowing in a downstream direction (e.g., in an axially aft direction; left-to-right in FIG. 4) away from an inlet 96 to the conduit 92; e.g., generally radially towards the inner combustor wall 58. The deflector 90 of FIG. 4, for example, is configured as a ramped deflector; e.g., a cantilevered ramp, a canted flange, a wedge, etc. More particularly, the deflector 90 of FIG. 4 is connected to (e.g., formed integral with, or mechanically fastened, welded, brazed, adhered and/or otherwise attached to) the case wall 88. The deflector 90 may be cantilevered from the case wall 88 such that the deflector 90 projects outward from the case wall 88, in a direction 98 (see FIG. 5) into the combustor plenum 68 and towards (but not to) the inner combustor wall 58, to a (e.g., aft and/or downstream) distal end 100 of the deflector 90. This deflector distal end 100 may be an unsupported end. For example, besides the connection between the deflector 90 and the case wall 88 at a forward and/or upstream end 102 of the deflector 90, the deflector 90 and its distal end 100 may be spatially separated from the case wall 88 (and/or any other component) by a (e.g., radial) gap. In the embodiment of FIG. 4, the deflector distal end 100 is displaced axially aft of and radially outward from the deflector forward and/or upstream end 102.

Figure 5:
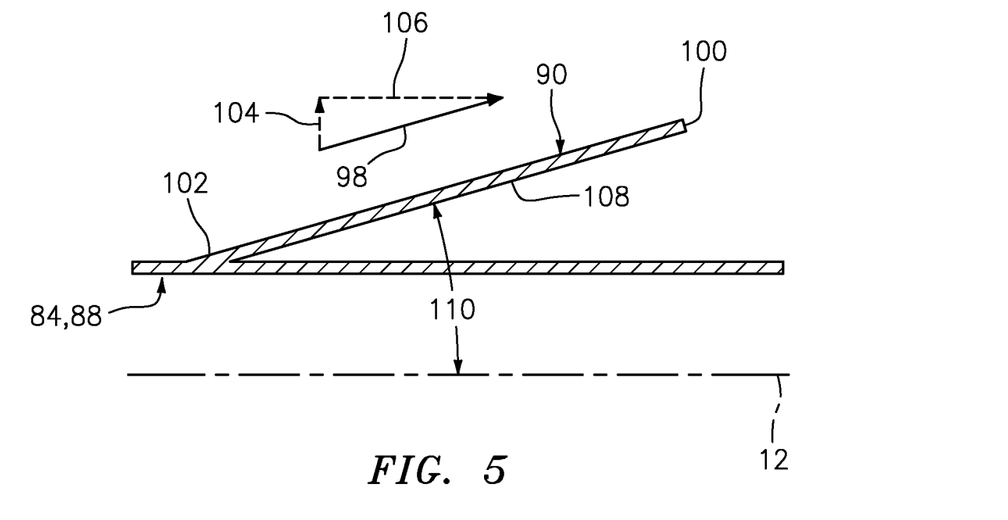
FIG. 5 is a partial side sectional schematic illustration of a deflector projecting out from a case wall.

Referring to FIG. 5, the direction 98 of the deflector 90 includes a radial (e.g., outward/away from the axial centerline 12) component 104 relative to the axial centerline 12. The direction 98 of FIG. 5 may also include an axial (e.g., aft, downstream) component 106 along the axial centerline 12. A chord line 108 of at least a major portion (e.g., more than fifty to 60 percent) or an entirety of the deflector 90 may thereby be angularly offset from a reference line (e.g., the axial centerline 12) by a non-zero deflector angle 110. Note, the term "chord line" may described a straight line extending between two points (e.g., end points) along a body. For example, the chord line 108 of FIG. 5 extends between the deflector forward and/or upstream end 102 and the deflector distal end 100.

The deflector angle 110 may be an acute angle between, for example, ten or fifteen degrees (10-15°) and forty-five or sixty degrees (45-60°). The deflector angle 110 of FIG. 5, for example, may be about (e.g., +/−5°) or exactly thirty degrees (30°). The present disclosure, however, is not limited to the foregoing exemplary deflector angles. For example, in other embodiments, the deflector angle 110 may be less than ten or fifteen degrees (10-15°) or greater than forty-five or sixty degrees (45-60°).

The deflector 90 of FIG. 5 is configured with a straight, linear sectional geometry when viewed, for example, in a plane parallel with and coincident with the axial centerline 12; e.g., the plane of FIG. 5. The present disclosure, however, is not limited to such an exemplary sectional geometry. For example, in other embodiments, the sectional geometry may be non-straight; e.g., curved and/or otherwise bent.

Referring again to FIG. 4, the deflector 90 may be axially aligned with and thereby axially overlapped by at least a portion of an axial forwardmost portion 112 of the inner combustor wall 58. This axial forwardmost portion 112 may be, for example, an axial forward half of the inner combustor wall 58. More particularly, the axial forwardmost portion 112 may be a portion of the inner combustor wall 58 that extends from the forward and/or upstream end 62 to the intermediate point 72 axially along the inner combustor wall 58. However, in other embodiments, the axial forwardmost portion 112 may be an axial forward third, fourth, fifth, etc. of the inner combustor wall 58, or in an axial forward three-quarters or two-thirds of the inner combustor wall 58. The deflector 90 of FIG. 4 may also or alternatively be arranged axially forward and/or upstream of one or more or all of the inner combustor wall quench apertures 66. The present disclosure, however, is not limited to the foregoing exemplary deflector configuration and/or locations.

The conduit 92 of FIG. 4 is configured to direct the gas (e.g., air/core gas) received from within the combustor plenum 68 to another component 114 of the turbine engine 10 (schematically shown in FIG. 4). In this manner, the turbine engine component 114 may receive the gas, for example, for cooling purposes. In the embodiment of FIG. 4, the turbine engine component 114 is configured as a component (e.g., the HPT rotor 31, its disk(s) and/or its blades) of the turbine section 21 (e.g., the HPT section 21A). More particularly, the conduit 92 of FIG. 4 is configured to route the gas (in the form of bled cooling air) to a tangential onboard injector ("TOBI") nozzle 116 (or any other type of nozzle or outlet orifice), which nozzle 116 (or orifice) is configured to direct the gas to the turbine engine component 114. The gas received by the turbine engine component 114 may subsequently flow about, around and/or through (e.g., one or more internal passages 118 within) the gas turbine engine component 114 to (e.g., convectively) cool that component 114.

The conduit 92 of FIG. 4 is configured as part of and/or (e.g., radially) adjacent and/or connected to the case wall 88. The conduit 92 of FIG. 4, for example, includes an internal flow path 120 formed within the case wall 88 radially between an inner portion 122 of the case wall 88 and an outer portion 124 of the case wall 88. The inlet 96 to the conduit 92 is located at (e.g., on, adjacent or proximate) a forward and/or upstream end 126 of the conduit 92.

The conduit forward and/or upstream end 126 of FIG. 4 may be axially overlapped by the axial forwardmost portion 112 of the inner combustor wall 58. The conduit forward and/or upstream end 126 may also or alternatively be located axially forward and/or upstream of one or more or each of the inner combustor wall quench apertures 66. With this arrangement, the inlet 96 to the conduit 92 may also be axially overlapped by the axial forwardmost portion 112 of the inner combustor wall 58 and/or located axially forward and/or upstream of one or more or each of the inner combustor wall quench apertures 66. The inlet 96 of FIG. 4 is located at the deflector distal end 100. The inlet 96 of FIG. 4 is further located axially between the deflector distal end 100 and a forward and/or upstream end 128 of the gate 94.

The gate 94 is configured to reduce and/or prevent (e.g., eliminate) gas within the combustor plenum 68 that passes the inlet 96 and then recirculates ("recirculating gas") from flowing into the inlet 96. The gate 94 of FIG. 4, for example, is configured as a ramped gate; e.g., a cantilevered ramp, a canted flange, a deflector, a wedge, etc. More particularly, the gate 94 of FIG. 4 is connected to (e.g., formed integral with, or mechanically fastened, welded, brazed, adhered and/or otherwise attached to) the case wall 88 (e.g., its outer portion 124) and/or the conduit 92. The gate 94 may be cantilevered from the case wall 88 and/or the conduit 92 such that the gate 94 projects outward from the case wall 88 and/or the conduit 92, in a direction 130 (see FIG. 6) into the combustor plenum 68 and towards (but not to) the inner combustor wall 58, to a (e.g., aft and/or downstream) distal end 132 of the gate 94. This gate distal end 132 may be an unsupported end. For example, besides the connection between the gate 94 and the case wall 88 and/or the conduit 92 at its forward and/or upstream end 128, the gate 94 and its distal end 132 may be spatially separated from the case wall 88 and/or the conduit 92 (and/or any other component) by a (e.g., radial) gap. In the embodiment of FIG. 4, the gate distal end 132 is displaced axially aft of and radially outward from the gate forward and/or upstream end 128.

Figure 6:
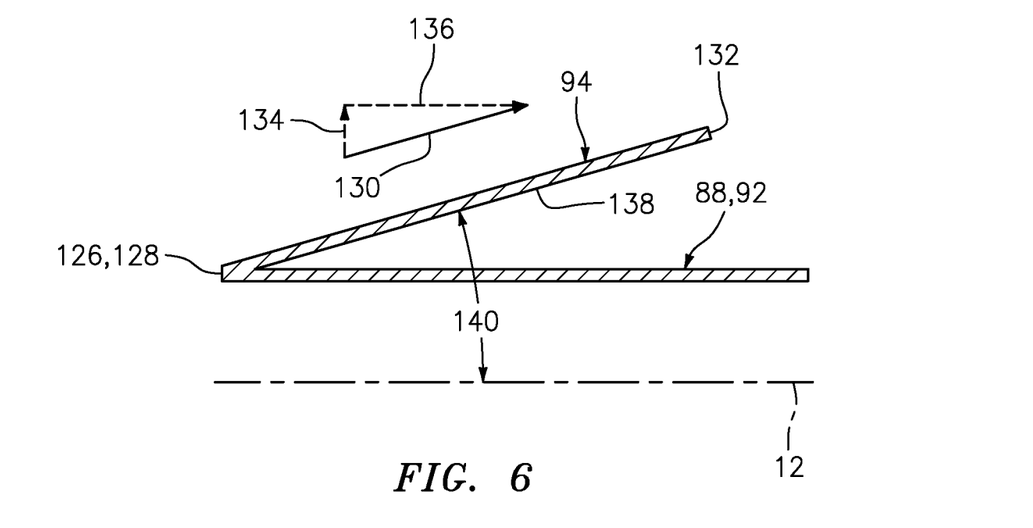
FIG. 6 is a partial side sectional schematic illustration of a gate projecting out from a conduit.

Referring to FIG. 6, the direction 130 of the gate 94 includes a radial (e.g., outward/away from the axial centerline 12) component 134 relative to the axial centerline 12. The direction 130 of FIG. 6 may also include an axial (e.g., aft, downstream) component 136 along the axial centerline 12. A chord line 138 of at least a major portion (e.g., more than fifty to 60 percent) or an entirety of the gate 94 may thereby be angularly offset from the reference line (e.g., the axial centerline 12) by a non-zero gate angle 140. For example, the chord line 138 of FIG. 6 extends between the gate forward and/or upstream end 128 and the gate distal end 132.

The gate angle 140 may be an acute angle between, for example, ten or fifteen degrees (10-15°) and forty-five or sixty degrees (45-60°). The gate angle 140 of FIG. 6, for example, may be about (e.g., +/−5°) or exactly thirty degrees (30°). The present disclosure, however, is not limited to the foregoing exemplary gate angles. For example, in other embodiments, the gate angle 140 may be less than ten or fifteen degrees (10-15°) or greater than forty-five or sixty degrees (45-60°). In some embodiments, the gate angle 140 may be equal to the deflector angle 110 (see FIG. 5). In other embodiments, the gate angle 140 may be different (e.g., less or greater) than the deflector angle 110 (see FIG. 5).

The gate 94 of FIG. 6 is configured with a straight, linear sectional geometry when viewed, for example, in a plane parallel with and coincident with the axial centerline 12; e.g., the plane of FIG. 6. The present disclosure, however, is not limited to such an exemplary sectional geometry. For example, in other embodiments, the sectional geometry may be non-straight; e.g., curved and/or otherwise bent.

Figure 7:
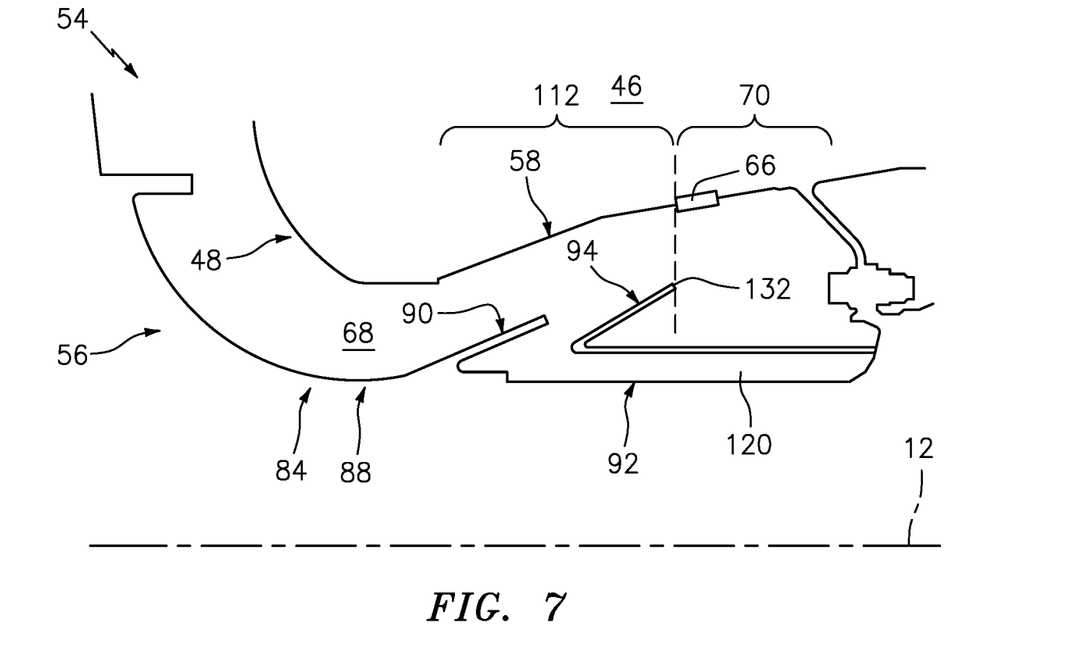
FIG. 7 is a partial side sectional illustration of the turbine engine assembly with another gate configuration.

Referring again to FIG. 4, the gate forward and/or upstream end 128 is connected to the case wall 88 and/or the conduit 92 at (e.g., on, adjacent or proximate) the inlet 96 to the conduit 92. The gate forward and/or upstream end 128 may thereby be axially overlapped by the axial forwardmost portion 112 of the inner combustor wall 58 and/or located axially forward and/or upstream of one or more or each of the inner combustor wall quench apertures 66. In addition, at least a forward and/or upstream portion (or an entirety; e.g., see FIG. 7) of the gate 94 may be axially overlapped by the axial forwardmost portion 112 of the inner combustor wall 58 and/or located axially forward and/or upstream of one or more or each of the inner combustor wall quench apertures 66.

Figure 8:
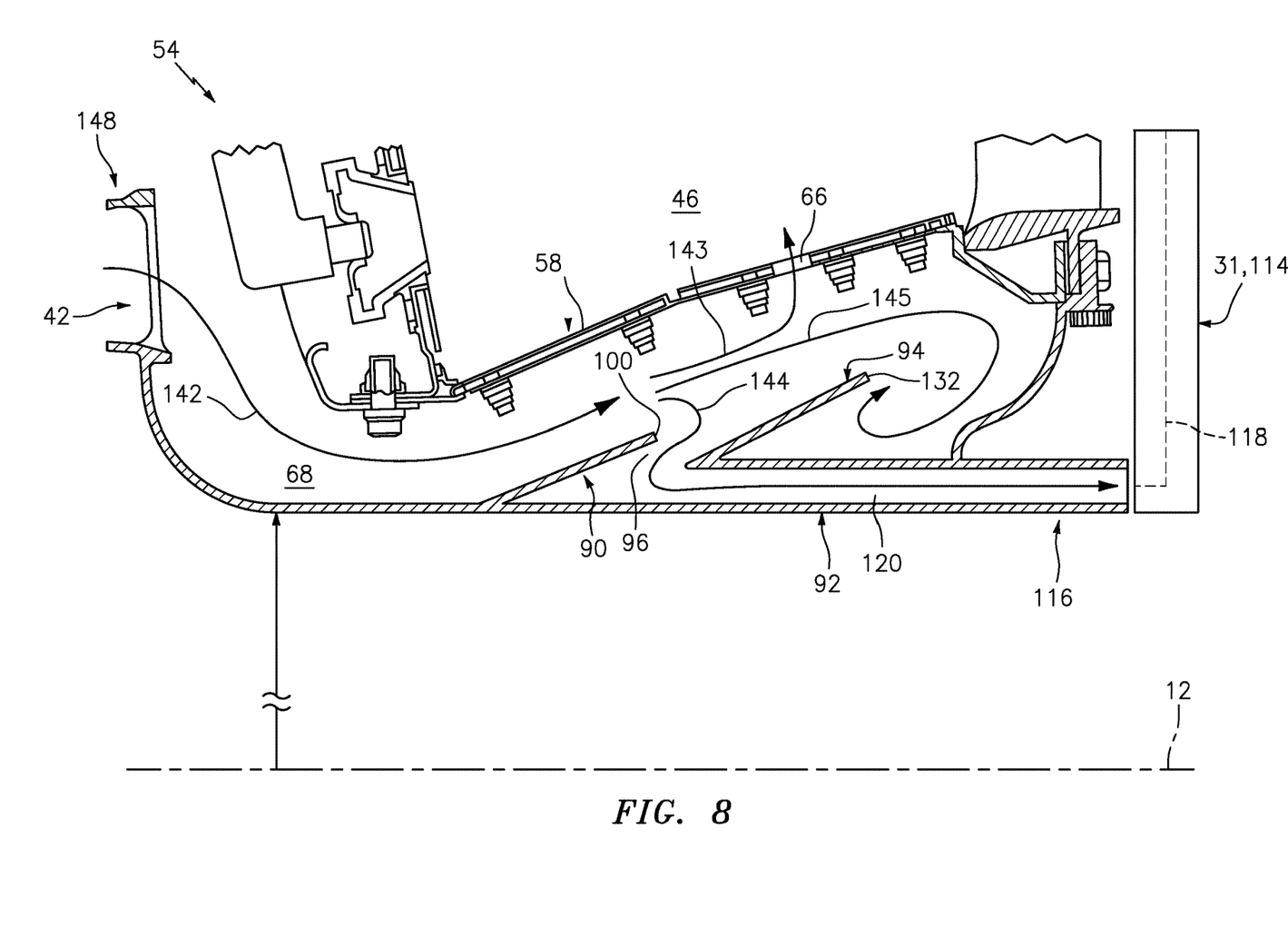
FIG. 8 is another partial side sectional illustration of the turbine engine assembly depicting select gas flow trajectories during operation.

FIG. 8 partially depicts generally trajectories of certain gas flows 142-145 within the turbine engine assembly 54 during turbine engine operation. A first (e.g., main, source) gas flow 142 enters the combustor plenum 68 from a pre-diffuser module 148. This first gas flow 142 travels through the combustor plenum 68 in a downstream and generally axially aft direction. As the first gas flow 142 reaches the deflector 90, the deflector 90 deflects the first gas flow 142 outward away from the case wall 88 and towards the inner combustor wall 58. As the first gas flow 142 reaches the deflector distal end 100, the first gas flow 142 may separate into two or more sub-flows; e.g., a second gas flow 143, a third gas flow 144 and a fourth gas flow 145. The second gas flow 143 may continue to travel axially aft towards and to the inner combustor wall quench apertures 66. The second gas flow 143 may then pass through the inner combustor wall quench apertures 66 and into the combustion chamber 46. The third gas flow 144, in contrast, may turn around (e.g., more than ninety degrees (90°)) the deflector distal end 100 and enter the inlet 96 to the conduit 92. This third gas flow 144 may then travel/flow through the conduit 92 and the TOBI nozzle 116 and into the turbine engine component 114 (e.g., the HPT rotor 31) for cooling purposes as described above. Similar to the second gas flow 143, the fourth gas flow 145 may also continue to travel axially aft and past the inlet 96. However, instead of flowing through the inner combustor wall quench apertures 66, the fourth gas flow 145 may travel past the quench apertures 66 and/or recirculate within an aft portion of the combustor plenum 68. The gate 94 provides a barrier to prevent (or reduce the amount of) the recirculating fourth gas flow 145 from entering the inlet 96.

Under certain conditions, the first gas flow 142 may include debris (e.g., dirt, sand, etc.) entrained therewith. Such debris can accumulate on surfaces of different turbine engine components and thereby insulate those components from the gas; here, functioning as a cooling fluid. For example, a typical prior art TOBI with an inlet at an aft and/or downstream end of the combustor may receive a gas flow with entrained debris which may collect on a downstream component to be cooled. However, by including and positioning the deflector 90 of the present disclosure in a relatively high velocity zone of the gas flowing within the combustor plenum 68 (e.g., the deflector 90 locations described above), momentum of the debris entrained in the first gas flow 142 may cause the debris to continue to travel axially aft and past the inlet 96 (e.g., along with the flows 143 and/or 145) while some of the gas without any (or without at least some) of the debris will turn and flow into the inlet 96 as described above. As a result, little or no debris may accumulate on the turbine engine component 114 which receives the third gas flow 144 from the conduit 92. In addition, by including and positioning the gate 94 of the present disclosure next to and aft and/or downstream of the inlet 96, the gate 94 may prevent a now relatively low velocity zone of the gas from flowing back and into the inlet 96 and carrying debris still entrained therewith. The inclusion of the deflector 90 and the gate 94 may reduce likelihood of the turbine engine component 114 from losing its cooling effectiveness compared to an engine with a prior art TOBI bleed assembly.

Figure 9:
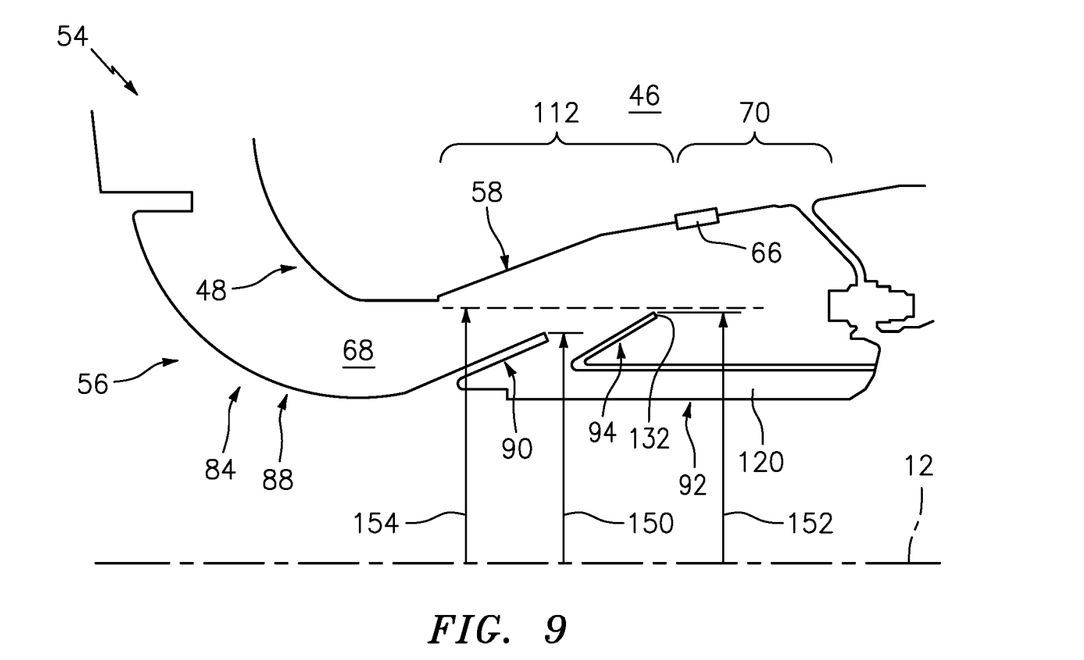
FIG. 9 is a partial side sectional illustration of the turbine engine assembly with still another gate configuration.

In some embodiments, referring to FIG. 9, the deflector 90 and/or the gate 94 may each be configured with a maximum radius 150, 152 that is sized less than a minimum radius 154 of the combustor 48. Such an arrangement may aid in facilitating assembly of the components 48 and 56; e.g., translating of the components 58 and 84 axially relative to one another during assembly.

In some embodiments, the turbine engine assembly 54 may be configured without the gate 94.

In some embodiments, the deflector 90 and/or the gate 94 may be non-cantilevered components.

In some embodiments, the conduit 92 may be configured as a separate component from the case wall 88.

The terms "upstream", "downstream", "inner" and "outer" are used to orientate the turbine engine assembly 54 and its components relative to the turbine engine 10 and its axial centerline 12. A person of skill in the art will recognize, however, one or more of these components may be utilized in other orientations than those described above. The present disclosure therefore is not limited to any particular spatial orientations.

The turbine engine assembly 54 may be included in various turbine engines other than the one described above. The turbine engine assembly 54, for example, may be included in a geared turbine engine where a gear train connects one or more shafts to one or more rotors in a fan section, a compressor section and/or any other engine section. Alternatively, the turbine engine assembly 54 may be included in a turbine engine configured without a gear train. The turbine engine assembly 54 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, the assembly comprising:
   a combustor wall configured with a quench aperture;
   a case displaced from the combustor wall such that a plenum is formed by and extends between the combustor wall and the case;
   the case comprising an inner portion of a case wall extending between a compressor and a turbine, a deflector, a gate, and an outer portion of the case wall radially outward of the inner portion, wherein a conduit is defined between the inner portion and the outer portion of the case wall to supply air from the plenum to the turbine for cooling;
   the deflector projecting out from the inner portion of the case wall into the plenum towards the combustor wall, and the deflector arranged upstream of the quench aperture;
   the gate projecting out from the outer portion of the case wall into the plenum towards the combustor wall; and
   an inlet to the conduit arranged next to and downstream of the deflector and upstream of the gate, and the inlet to the conduit arranged axially upstream of the quench aperture.

2. The assembly of claim 1, wherein the case is displaced radially inward of the combustor wall relative to an axis of the gas turbine engine.

3. The assembly of claim 1, wherein the deflector is arranged axially upstream of the quench aperture relative to an axis of the gas turbine engine.

4. The assembly of claim 1, wherein the deflector is axially overlapped by an axial upstream-most half of the combustor wall.

5. The assembly of claim 1, wherein the deflector comprises a ramped deflector.

6. The assembly of claim 1, wherein the deflector is cantilevered from the case wall.

7. The assembly of claim 1, wherein the deflector projects out from the case wall in a direction that includes a radial outward component and an axially downstream component relative to an axis of the gas turbine engine.

8. The assembly of claim 1, wherein the deflector is configured such that gas flowing within the plenum turns more than ninety degrees around a distal end of the deflector before entering the inlet.

9. The assembly of claim 1, wherein the gate is configured to reduce or prevent recirculating gas within the plenum from flowing into the inlet.

10. The assembly of claim 9, wherein
the deflector has a deflector chord line that is angularly offset from an axis by a deflector angle; and
the gate has a gate chord line that is angularly offset from the axis by a gate angle that is equal to the deflector angle.

11. The assembly of claim 9, wherein
the deflector has a deflector chord line that is angularly offset from an axis by a deflector angle; and
the gate has a gate chord line that is angularly offset from the axis by a gate angle that is different than the deflector angle.

12. The assembly of claim 9, wherein the gate is connected to the conduit at the inlet.

13. The assembly of claim 9, wherein the gate is cantilevered from the conduit.

14. The assembly of claim 1, wherein the inlet is arranged upstream of the quench aperture.

15. The assembly of claim 1, further comprising a tangential onboard injector nozzle fluidly coupled with the plenum through the conduit.

16. The assembly of claim 1, further comprising:
a turbine component;
the conduit fluidly coupling a passage in the turbine component with the plenum.

17. The assembly of claim 1, further comprising:
an annular combustor comprising an inner combustor wall, an outer combustor wall and a bulkhead, wherein the inner combustor wall comprises the combustor wall;
the bulkhead extending radially between and connected to the inner combustor wall and the outer combustor wall.

18. An assembly for a gas turbine engine, the assembly comprising:
a combustor wall extending axially along and circumferentially about an axial centerline;
a case radially displaced from the combustor wall, wherein a plenum extends radially from the case to the combustor wall;
the case comprising an inner portion of a case wall extending between a compressor and a turbine, a deflector, a gate, and an outer portion of the case wall radially outward of the inner portion, wherein a conduit is defined between the inner portion and the outer portion of the case wall to supply air from the plenum to the turbine for cooling;
the deflector projecting out from the inner portion of the case wall, into the plenum and towards the combustor wall, to a downstream distal end of the deflector, and the downstream distal end of the deflector axially overlapped by an axially upstream half of the combustor wall;
the gate projecting out from the outer portion of the case wall into the plenum towards the combustor wall; and
an inlet to the conduit arranged between the downstream distal end of the deflector and an upstream end of the gate.

* * * * *